June 25, 1968   R. J. BRISON ET AL   3,390,000
SEPARATION OF LUPULIN FROM HOPS
Filed Dec. 2, 1965   2 Sheets-Sheet 1

INVENTORS
ROBERT J. BRISON
JOHN H. LITCHFIELD

BY Cushman, Darby & Cushman
ATTORNEYS

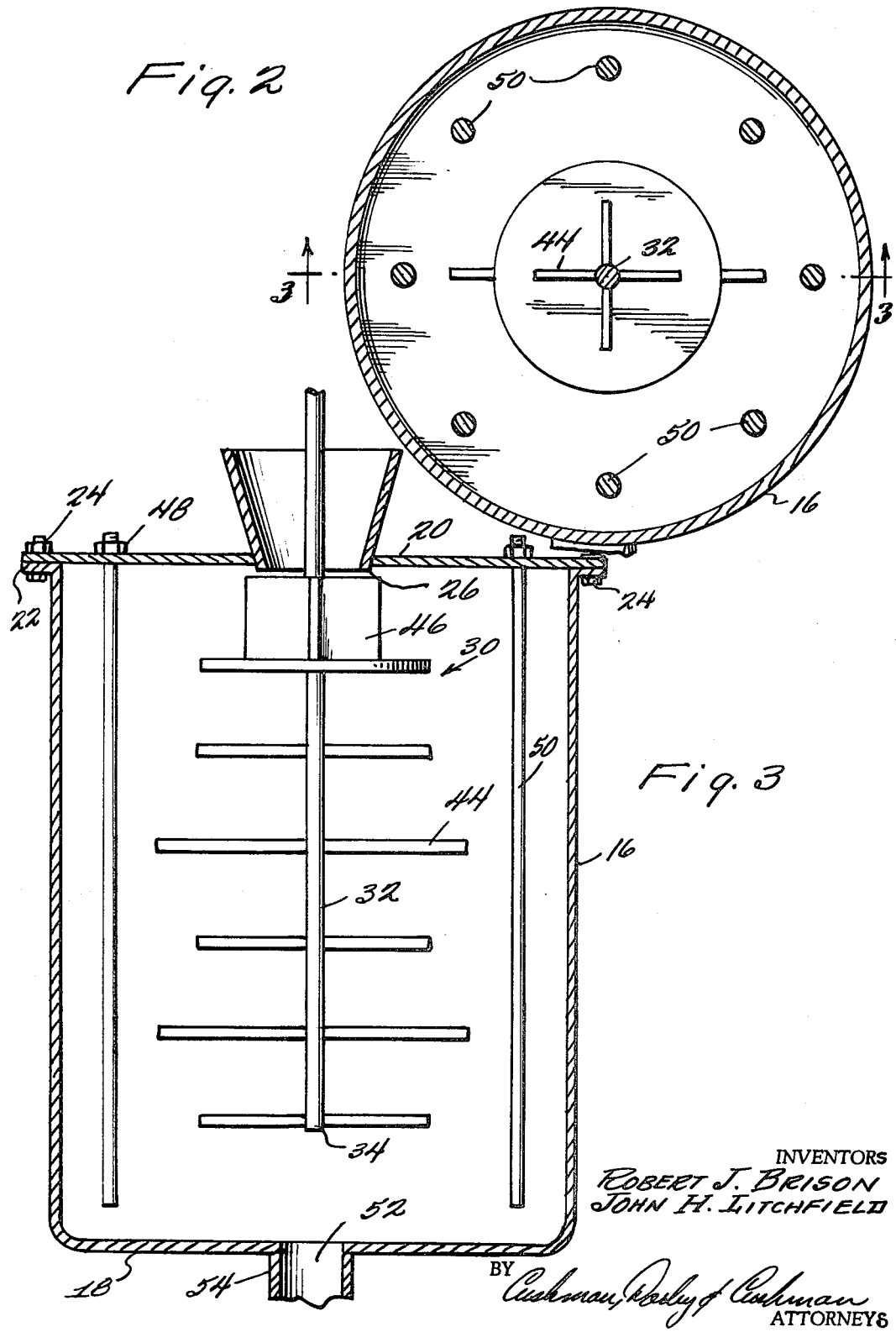

United States Patent Office 3,390,000
Patented June 25, 1968

3,390,000
SEPARATION OF LUPULIN FROM HOPS
Robert J. Brison and John H. Litchfield, Columbus, Ohio, assignors to John I. Haas Inc., Washington, D.C., a corporation of Delaware
Filed Dec. 2, 1965, Ser. No. 511,110
15 Claims. (Cl. 99—50)

This invention relates to a method of separating lupulin from hops.

In the production of beer or ale one important ingredient employed is hops. Hops contain certain soft resins which impart not only bitterness to the beer, but also aroma. In the usual practice the hop cones which include the leaves, stems, petals, lupulin and at times, seeds, are boiled in their entirety within a sugary wort in order to extract the necessary resins and aromatic oils from the lupulin thereof. The lupulin particles are closed cup-like fibrous containers filled with hop flavoring substance including a relatively small amount of moisture, and essentially soft bitter resins and volatile aromatic oils.

It has been known however, that the flavor content of lupulin deteriorates in the ordinary practice of drying the hops prior to shipment to the brewery and that oxidation of lupulin occurs easily if the dried hops are not placed in sealed containers (preferably in an inert atmosphere) thus avoiding further oxidation thereof.

It will be recognized that such a procedure is costly since it involves packaging and handling extraneous materials. Efforts dating back to the mid-nineteenth century have been directed to separating the lupulin from the hops although certain economic disadvantages have prevented their widespread acceptance. Further, many of these efforts result in a lupulin product excessively fragmented or crushed, thus exposing its valuable constituents to unnecessarily rapid and disadvantageous oxidation.

For instance, British Patent 2,458, dated Oct. 27, 1859, describes beating, threshing and cutting hops wherein the seed and lupulin are separated from the leaf in a circular inclined screen and revolving brush or brushes. Such severe handling of the delicate lupulin particles ruptures the lupulin and exposes the valuable resins and aromatic oils to oxidative conditions.

Later in the U.S. Patent 338,027, Mar. 16, 1886, a method for separating lupulin from hop cones was advanced wherein the hop cones were first thoroughly dried and thereafter sifted on sieves through which small fragments of the leaflets were allowed to pass along with the lupulin. The operation was generally conducted at about 20° C.

Subsequently in U.S. Patent 478,508, July 5, 1892, hops were torrefied in an agitated vessel at a temperature of about 212° F. It will be recognized that such an elevated temperature is detrimental to the preservation of the volatile aromatic oils present in the lupulin particle.

In the early twenties, a method described in U.S. Patent 1,464,520, dated Oct. 6, 1922, proposed separating lupulin from hops by first grinding the hops and then separating the lupulin therefrom by sieves. Again, these extreme methods failed to recognize the easy susceptibility of the lupulin to oxidative deterioration and the operating conditions advanced by this patent did not adequately insure against it.

U.S. Patent 2,833,652, of May 6, 1958, employed relatively low operating temperatures in lupulin separation procedures to aid in the retention of the valuable constituents thereof. This patent proposed first freezing the entire hops and then shaking them so as to free the frozen lupulin particles.

Subsequently, in U.S. Patent 2,952,546, Sept. 13, 1960, it was recognized that there are technical difficulties in freezing hops in addition to the fact that these freezing procedures are expensive and cumbersome.

It is therefore an important object of the instant invention to overcome the disadvantages of prior art methods of separating lupulin from hops.

It is a further object of the instant invention to provide an improved method of separating lupulin particles from hops in the substantial absence of damage or comminution of said lupulin particles.

Another object of the instant invention is to provide an improved, simplified and economical method of separating lupulin particles from hops in the absence of appreciable particle size reduction and in the absence of appreciable oxidation or deterioration of the soft resin or volatile aromatic oil content of said lupulin particles.

Still another object of the instant invention is to provide a simple, effective method of separating lupulin from hops which method can be implemented at the ranch or vine location and wherein the hops treated can be fresh (not dried, dehydrated or stored for any substantial length of time) or dried or a mixture thereof.

These and other objects of the invention will become apparent from a study of this specification, the accompanying drawings and the appended claims in which the various novel features of the invention are more particularly set forth.

FIGURE 2 is a plan view taken on the line 2—2 of FIGURE 1; and

FIGURE 3 is a vertical section taken on the line 3—3 of FIGURE 2.

Figure 1:
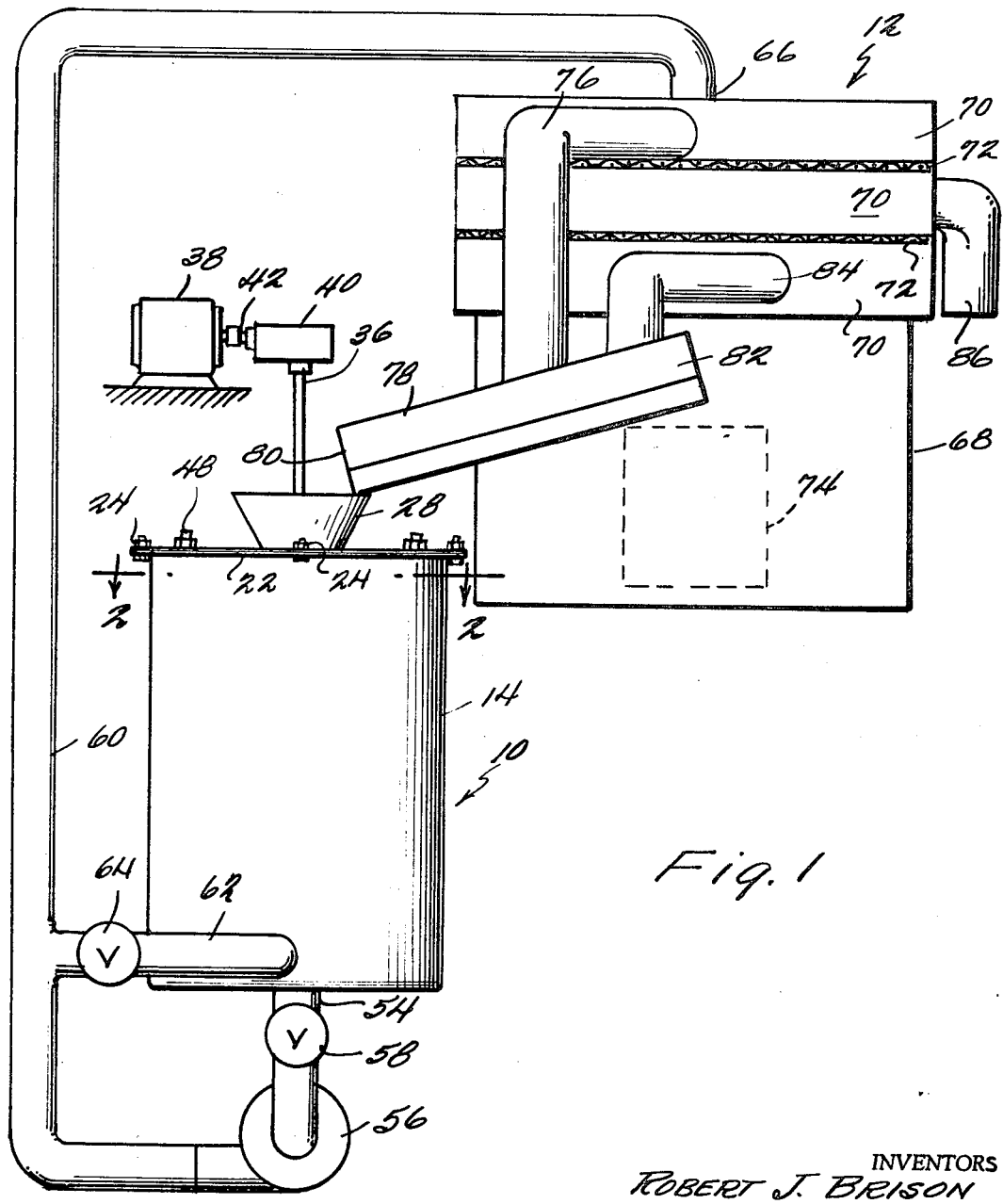
FIGURE 1 is a diagrammatic view in elevation of the apparatus employed in the instant invention to effectively, simply and economically separate lupulin from hops, fresh, dried or a mixture thereof.

Referring in detail to the drawings, one convenient form of apparatus suitable for the practice of the instant invention comprises in combination an agitation assembly 10 and a screening assembly 12. The agitation assembly 10 comprises an agitation vessel 14 of any convenient size and shape, having a cylindrical wall 16, a bottom 18 and a top 20. The cylindrical wall adjacent the upper end is provided with a radially outwardly extending flange 22 for detachable engagement with top 20 by any convenient means such as bolts 24.

The top 20 is provided with an axially positioned aperture 26 into which is fixedly attached funnel-shaped feed inlet 28. Extending axially within the agitation vessel 14 is agitation means 30 comprising agitation shaft 32, the lower end 34 of which is spacedly removed from the bottom 18 of the vessel. The upper end 36 of said shaft 32 is operatively connected to actuation means 38, for instance, a reversible electric motor through gear means 40 and drive shaft 42.

Extending radially outwardly from the agitator shaft 32 within the vessel 10 are a plurality of paddles 44. Adjacent the uppermost paddle and subjacent the aperture 26 of the vessel there is provided foam inhibiting means 46 such as a multi-bladed turbine-type paddle which is also fixedly attached to the agitator shaft 32. Depending downwardly into the vessel and detachably secured to the top 20 thereof, for instance, by bolt means 48, are a plurality of circumferentially spaced baffle rods 50 intermediate the agitator shaft 32 and the cylindrical wall 16 of the vessel 14.

The bottom 18 of the vessel is provided with an axially aligned outlet 52 which is in communication with conduit means 54 leading to pump means 56 through valve 58. The outlet of pump means 56 is in fluid communication with the screening assembly 12 through conduit 60.

Pump 56 by-pass means can also be provided, said by-pass means comprising a conduit 62 extending tangentially outwardly from adjacent the lower portion of the vessel 14 and in fluid communication with conduit 60 and valve means 64.

The discharge end 66 of conduit 60 is in fluid communication with a conventional separating assembly 12 which can be, for instance, a Sweco Vibro-Energy Separator having vibrating means 74 housed in the member 68. The screening assembly 12 comprises a plurality of chambers 70 consisting essentially of a first chamber, a last chamber and at least one intermediate chamber, which chambers are separated from each other by a screen assembly 72.

In fluid communication with the uppermost or first chamber 70 is a conduit 76, the discharge end of which is in fluid communication with the feed inlet 28 of the vessel 14 through launder 78 whose longitudinal axis is conveniently inclined so that its discharge end 80 is lower than the inlet end 82 thereof.

In fluid communication with the last chamber is a conduit 84 also in fluid communication with the feed inlet 28 of the vessel 14 through launder 78. The discharge end of conduit 84 is also positioned adjacent the inlet end 82 thereof.

Leading from an intermediate chamber is lupulin recovery conduit 86 which empties the lupulin into any suitable receptacle or container (not shown).

In one mode of operation, a batch of hops is fed into the cylindrical vessel 14 through the funnel-shaped feed inlet 28 together with an inert liquid to provide a hop slurry. The inert liquid employed is one which does not substantially react with or dissolve the resins contained in the lupulin. Preferably the inert liquid chosen is water. The temperature of the water must be sufficiently low to inhibit deterioration of the soft resin and aromatic volatile oil content of the lupulin during the agitation and separation procedure. Conveniently, the temperature can range from about 1–20° C. or even higher, the choice of temperature being dependent on a number of variables such as the particular type of hops being treated. Thus, lower temperatures are more favorable when fresh, frozen hopes are treated according to the instance invention while temperatures between 10°–20° C. or even higher can effectively be employed when processing baled hops to recover lupulin. The ratio of hops to water can be varied and ordinarily the slurry will comprise 0.5 to 2 pounds of hops per gallon of water.

The hop slurry is agitated by rotation of the agitator shaft 32 and associated paddles 44 driven by motor 38. Baffle rods 50 aid in the agitation by impeding rotation of the hop slurry in the vessel 14.

During the agitation cycle the hop slurry is continuously discharged through vessel outlet 52, conduit 54 and valve 58 to pump 56 which transfers the mixture through conduit 60 to the top of the vibrating screen assembly 12. The uppermost screen 72 is of a suitable mesh size to pass the lupulin particles but retain the hop bracts, strigs, etc., the latter being discharged from the upper chamber 70 through spout 76. The mesh size of the uppermost or first screen 72 can range between 10 and 100 mesh and preferably a 65 mesh screen is employed. The mesh size of the lowermost or last screen 72 can range between 150 and 325 mesh and is, preferably, 200 mesh. The lowermost screen passes substantially the liquid component of the slurry but retains the lupulin particles which are discharged from intermediate chamber 70 through spout 86 into a suitable container. Alternatively, the lupulin particles can be conducted to a further dewatering zone, if desired.

The substantially liquid component of the hop slurry is discharged from the lowermost chamber 70 through spout 84 to the upper inclined end 82 of launder 78 transferring with it the bracts and sprigs from spout 76 for re-introduction into the vessel 14 via the funnel-shaped inlet 28, which is in communication with the lower inclined end 80 of the launder 78. Adjacent the inlet 26 of vessel 14, the multibladed turbine-type paddle 46 is employed to substantially inhibit or break up foam produced during the agitation cycle. The above described cyclic operation is continued for a time sufficient until essentially no more lupulin can be removed from the hops. At this time the spout 76 can be diverted to a separate container to remove the spent bracts, sprigs, etc. from the system. Spout 76 can then be returned to its position where it is in communication with the launder 78 and the process repeated using a fresh batch of hops to produce another hop slurry. Sufficient water is added with the fresh batch of hops to replace the water contained in the spent bracts, etc., as removed from the system.

In another embodiment of the instant invention, valve 58 in conduit 54 leading to pump 56, can be closed and valve 64 in conduit 62 leading to conduit 60 can be opened so that the contents of vessel 14 can be discharged through the tangentially connected conduit 62 rather than through the pump 56. In this embodiment, the baffles 50 are removed. The rotation of the paddles 44 at predetermined speeds ranging generally from about 100 to 1000 r.p.m. is sufficient to cause rotation of the hop slurry so that it is held against the cylindrical wall 16 of the vessel 14 by centrifugal force. Again, it will be understood that the choice of any particular speed of rotation will depend on a number of variables such as, for instance, the particular type of hops being treated, i.e., dried, baled, frozen, etc., and the temperature and time of treatment. In this operation, the pressure and velocity head at the vessel's tangential discharge are sufficient to transport the contents thereof to the vibrating screen assembly 12. It will be recognized, of course, that pump means could also be employed if desired. This centrifugal mode of operation is preferred generally because it permits initial separation of lupulin particles from the bracts within the agitation vessel 14, i.e. the lupulin particles which have been freed from the bracts move, preferentially, toward the outer wall 16 due to their greater specific gravity. Thus they will be transported to the vibrating screen assembly 12 ahead of the bulk of the bracts which are retained in the vessel 14 for further agitation. The centrifugal mode of operation also has been found to substantially minimize foaming during the agitation cycle. It will also be recognized that efficient operation of the invention will depend upon, for instance, such variables as the agitation speed and the number, ize and shape of the paddles. The determination of these variables to provide a suitable balance between agitation effect and centrifugal effect within the vessel can be made by those skilled in the art.

Twelve 300 gram samples from a supply of dry, baled hops were analyzed for their α and β acid content. The results of the analyses are as follows:

| Sample: | α-Acid, percent | β-Acid, percent |
| --- | --- | --- |
| 1 | 5.72 | 5.34 |
| 2 | 6.19 | 4.81 |
| 3 | 5.74 | 4.56 |
| 4 | 5.45 | 4.36 |
| 5 | 6.11 | 4.85 |
| 6 | 6.08 | 4.93 |
| 7 | 5.27 | 4.93 |
| 8 | 6.09 | 3.69 |
| 9 | 6.02 | 4.38 |
| 10 | 6.05 | 4.23 |
| 11 | 5.23 | 5.31 |
| 12 | 5.41 | 4.68 |
| Average | 5.78 | 4.59 |

In determining the lupulin recoverable from the dry, baled hops five runs were conducted, each run consisting of four groups of three batches each. Each batch of hops was introduced into the vessel 14 together with sufficient make-up water to provide a hop slurry which was subsequently agitated and circulated through the system in the centrifugal mode of operation as previously described. After 20 minutes, the spent bracts, etc., were removed from the system as described above. At the end of each run the screen was disassembled and any lupulin found in the screen was added to that recovered from the last batch. The lupulin product from each set of three batches was freeze dried, weighed and analyzed. The results of the runs are tabulated below in Table I.

TABLE I

| Batch Nos. | Weight (g.) | Assay, percent | | Grams | | Recovery | |
|---|---|---|---|---|---|---|---|
| | | α-Acid | β-Acid | α-Acid | β-Acid | α-Acid | β-Acid |
| Run 1: | | | | | | | |
| 1-3 | 118.5 | 36.10 | 27.51 | 42.78 | 32.60 | | |
| 4-6 | 126.1 | 35.48 | 27.68 | 44.74 | 34.90 | | |
| 7-9 | 127.1 | 34.02 | 30.58 | 43.24 | 38.87 | | |
| 10-12 | 136.9 | 36.91 | 32.26 | 50.53 | 44.16 | | |
| Total | 508.6 | 35.64 | 29.60 | 181.29 | 150.53 | 87.1 | 91.1 |
| Run 2: | | | | | | | |
| 13-15 | 127.2 | 35.02 | 30.17 | 44.55 | 38.38 | | |
| 16-18 | 143.9 | 33.38 | 29.64 | 48.03 | 42.65 | | |
| 19-21 | 131.2 | 33.19 | 30.66 | 43.55 | 40.23 | | |
| 22-24 | 125.4 | 34.02 | 29.75 | 42.66 | 37.31 | | |
| Total | 527.7 | 33.88 | 30.05 | 178.79 | 158.52 | 85.9 | 96.0 |
| Run 3: | | | | | | | |
| 25-27 | 125.6 | 33.50 | 29.75 | 42.08 | 37.37 | | |
| 28-30 | 126.3 | 35.59 | 29.18 | 44.95 | 36.85 | | |
| 31-33 | 136.3 | 33.87 | 29.10 | 46.16 | 39.66 | | |
| 34-36 | 131.9 | 32.41 | 27.97 | 42.75 | 36.89 | | |
| Total | 520.1 | 33.83 | 28.99 | 175.94 | 150.77 | 84.6 | 91.2 |
| Run 4: | | | | | | | |
| 37-39 | 144.6 | 32.85 | 28.45 | 47.50 | 41.14 | | |
| 40-42 | 125.1 | 33.75 | 25.05 | 42.22 | 31.34 | | |
| 43-45 | 138.2 | 31.75 | 26.65 | 43.88 | 36.83 | | |
| 46-48 | 129.5 | 35.40 | 20.61 | 45.84 | 26.69 | | |
| Total | 537.4 | 33.39 | 25.31 | 179.44 | 136.00 | 86.2 | 82.3 |
| Run 5: | | | | | | | |
| 49-51 | 125.0 | 38.32 | 24.84 | 47.90 | 31.05 | | |
| 52-54 | 128.7 | 31.94 | 29.75 | 41.11 | 38.29 | | |
| 55-57 | 131.9 | 34.10 | 28.53 | 44.98 | 37.63 | | |
| 58-60 | 143.3 | 32.86 | 28.11 | 47.09 | 40.28 | | |
| Total | 528.9 | 34.24 | 27.84 | 181.08 | 147.25 | 87.0 | 89.1 |

As can be seen from the above data the average α-acid analysis of the lupulin separated from the hops was 34.2%. Based on the hop analysis of 5.78% α-acid (average) the average α-acid recovery in the lupulin product was 86.2%, the average β-acid recovery being 89.9%. The total weight of the lupulin product from the five runs was 2,622.7 grams or 14.6 percent of the weight of the original hops treated according to this invention.

Advantageous lupulin recoveries were also achieved using fresh frozen hops and unbaled hops. Using 50 gram samples of fresh frozen and unbaled hops with 2500 ml. of deionized water for each sample to provide a hop slurry a lupulin separation technique, essentially the same as that described above with reference to dry, baled hops was repeated. The fresh frozen hops had an average α-acid content, dry basis, of 6.2% and an average β-acid content, dry basis, of 5.0% while the average α-acid content, dry basis, of the dried unbaled hops analyzed 6.6%. The results of the runs are tabulated below in Table II.

TABLE II

| Run | Hops | Assay, α-Acid (percent) | Recovery, β-Acid (percent) |
|---|---|---|---|
| 6 | Fresh Frozen | 43.3 | 84.1 |
| 7 | do | 34.8 | 84.7 |
| 8 | do | 35.3 | 86.1 |
| 9 | Dried Unbaled | 33.5 | 74.0 |
| 10 | do | 35.6 | 82.9 |
| 11 | do | 35.2 | 83.6 |

It will be readily apparent to those skilled in the art that many minor modifications can be made without departing from the spirit of the invention or the scope of the appended claims.

What is claimed is:

1. A method of obtaining lupulin particles from hops comprising mixing said hops with water to form a slurry, agitating said slurry to a degree sufficient to free substantially unruptured lupulin particles from the residual hops and separating by screening lupulin particles from the remainder of the slurry.

2. The method of claim 1 which includes separating said lupulin particles from the remainder of the mixture on a screen, said screen being sufficiently fine to retain thereon the lupulin particles and recovering said lupulin particles.

3. A method of obtaining lupulin particles from hops comprising mixing said hops with water to provide a hop slurry, agitating said slurry to a sufficient degree to free substantially unruptured lupulin particles from the residual hops in a first zone, transferring said slurry and freed lupulin particles to a second zone, separating said freed lupulin particles from the remainder of said slurry by screening and recovering said lupulin particles.

4. The method of claim 3 which includes separating said lupulin particles from the remainder of said hops on a first screen, said first screen being fine enough to retain thereon the remainder of said hops and coarse enough to pass the freed lupulin particles to a second screen, said second screen being fine enough to retain thereon said lupulin particles and coarse enough to pass the remainder of said slurry and recovering said lupulin particles.

5. The method of claim 4 which includes recycling hops remainder and said slurry remainder to said first zone.

6. A method of obtaining lupulin particles from hops comprising the steps of
   (1) mixing said hops with water to produce a hop slurry,
   (2) agitating said slurry to a sufficient degree to free substantially unruptured lupulin particles from the residual hops in a first zone,
   (3) continuously transferring said agitated slurry and freed lupulin particles to a second zone,
   (4) separating in the second zone said lupulin particles from the remainder of said hops on a first screen, said first screen being fine enough to retain thereon the remainder of said hops and coarse enough to pass the freed lupulin particles to a second screen, said second screen being fine enough to retain thereon said lupulin particles and coarse enough to pass the remainder of said slurry,
   (5) recovering said lupulin particles, (6) continuously recycling said hops remainder and said slurry remainder to said first zone, and (7) repeating steps 2–6 as long as desired.

7. The method of claim 6 wherein the weight ratio of hops to water in said slurry ranges between 1:100 to 1:5.

8. The method of claim 7 which includes adding additional water to maintain substantially said weight ratio.

9. The method of claim 8 wherein said hops are dried, baled hops and said slurry is agitated with a paddle revolving at a speed ranging between 100 and 1000 r.p.m.

10. A method of obtaining lupulin particles from hops comprising mixing said hops with water to provide a hop slurry, agitating said slurry to a sufficient degree to free substantially unruptured lupulin particles from the residual hops in a first zone, centrifuging said slurry including said freed lupulin particles and said hops in said first zone, transferring said freed lupulin particles with a minor portion of said slurry to a second zone, continually agitating and centrifuging the mapor portion of said slurry in said first zone, separating in the second zone said lupulin particles from said hops on a first screen, said first screen being fine enough to retain thereon the remainder of said hops and coarse enough to pass the freed lupulin particles to a second screen, said second screen being fine enough to retain thereon said lupulin particles and coarse enough to pass the remainder of said minor portion of said slurry and recovering said lupulin particles.

11. A method of obtaining lupulin particles from hops comprising the steps of (1) mixing said hops with water to produce a hop slurry, (2) agitating said slurry to a sufficient degree to free substantially unruptured lupulin particles from the residual hops in a first zone, (3) centrifuging said slurry including said freed lupulin particles and said hops in said first zone, (4) continuously transferring said freed lupulin particles and a minor portion of said slurry to a second zone, (5) continually agitating and centrifuging the major portion of said slurry in said first zone, (6) separating in the second zone said lupulin particles from said hops on a first screen, said first screen being fine enough to retain thereon the remainder of said hops and coarse enough to pass the freed lupulin particles to a second screen, said second screen being fine enough to retain thereon said lupulin particles and coarse enough to pass the remainder of said slurry, (7) recovering said lupulin particles, (8) continuously recycling said hops remainder and said slurry to said first zone, and (9) repeating steps 2–8 as long as desired.

12. Apparatus for obtaining lupulin particles from hops comprising a cylindrical vessel having an inlet and an outlet adaptable to confine a hop slurry, agitating means disposed within said vessel comprising an agitator shaft provided with a plurality of radially extending paddle members, foam inhibiting means fixedly attached to said agitator shaft immediately subjacent said cylindrical vessel inlet, and wherein said conduit means is in fluid communication between said agitating assembly and said separating assembly through said vessel outlet, and wherein said separating means comprises at least a first screen and a last screen, said first screen being fine enough to retain thereon the remainder of the hops and coarse enough to pass the freed lupulin particles, said last screen being fine enough to retain thereon said lupulin particles and coarse enough to pass the remainder of said slurry and means for withdrawing separated lupulin particles from said separating assembly.

13. The apparatus of claim 12 including means for transferring said hops remainder and said slurry remainder to said cylindrical vessel.

14. The apparatus of claim 12 including a plurality of axially disposed baffle rods within said vessel.

15. The apparatus of claim 12 wherein said conduit means includes a tangentially disposed conduit, the inlet end of which is in fluid communication adjacent the lower portion of the cylindrical wall of said vessel.

References Cited
UNITED STATES PATENTS 3,271,162   9/1966   Bishop.

ALVIN E. TANENHOLTZ, *Primary Examiner.*

N. ROSKIN, *Assistant Examiner.*